United States Patent
Furuki

Patent Number: 5,177,384
Date of Patent: Jan. 5, 1993

[54] STEPPING MOTOR AND CARRIAGE TRANSPORT

[75] Inventor: Shigeru Furuki, Furukawa, Japan

[73] Assignee: Alps Electric Co., Ltd., Tokyo, Japan

[21] Appl. No.: 717,442

[22] Filed: Jun. 19, 1991

[30] Foreign Application Priority Data

Jun. 27, 1990 [JP] Japan .................................. 2-166806
Apr. 1, 1991 [JP] Japan .................................. 3-092630

[51] Int. Cl.⁵ .......................................... H02K 37/00
[52] U.S. Cl. .................................. 310/49 R; 310/112; 310/257
[58] Field of Search .................... 310/49 R, 162, 163, 310/164, 165, 254, 216, 261, 257

[56] References Cited

U.S. PATENT DOCUMENTS

| | | | |
|---|---|---|---|
| 4,274,026 | 6/1981 | Haydon | 310/49 R |
| 4,327,299 | 4/1982 | Goddijn | 310/49 R |
| 4,330,724 | 5/1982 | Goddijn | 310/49 R |
| 4,501,981 | 2/1985 | Hansen . | |
| 4,942,325 | 7/1990 | Furaya | 310/49 R |
| 4,945,268 | 7/1990 | Nihei | 310/49 R |

Primary Examiner—R. Skudy
Attorney, Agent, or Firm—Guy W. Shoup; David W. Heid

[57] ABSTRACT

The phase difference between the pole teeth of a first stator and the pole teeth of a second stator is set to 30-80 degrees or 100-150 degrees in electrical angle, whereby the magnitude of combined torque of the torque generated by the pole teeth of the first stator and the torque generated by the pole teeth of the second stator becomes larger when the step number is odd and becomes smaller when the step number is even. Accordingly, when the number of steps for one motion is an even number at all times, the starting torque can be increased and the settling torque can be decreased.

2 Claims, 8 Drawing Sheets

Fig.12

*PRIOR ART*

| Step | Energization of Phase A | Energization of Phase B | Logic of Combined Torque |
|------|-------------------------|-------------------------|--------------------------|
| 0    | +                       | +                       | A + B                    |
| 1    | +                       | −                       | A − B                    |
| 2    | −                       | −                       | −(A + B)                 |
| 3    | −                       | +                       | −(A − B)                 |
| 4    | +                       | +                       | A + B                    |

STEPPING MOTOR AND CARRIAGE TRANSPORT

BACKGROUND OF THE INVENTION

1. Field of the Invention

The present invention relates to a stepping motor driven through two-phase excitation for use in a disk drive device or the like and a carriage transport mechanism employing such a stepping motor.

2. Description of Related Art

FIG. 6 is a sectional view showing a basic structure of a two-phase stepping motor.

Referring to FIG. 6, a rotor 1 is integrally constructed of a cylindrical magnet 2, magnetized such that poles N and poles S are alternately formed in its circumferential direction, and a shaft 3 arranged along the central axis of the magnet 2. Both end portions of the shaft 3 are supported for rotation by bearings, not shown. There are provided a first stator 4 and a second stator 5 both being ring-shaped and having the rotor 1 inserted in the central cavity portion thereof with a gap therebetween. The bottom face of the first stator 4 and the top face of the second stator 5 are fixedly joined together. The first stator 4 is formed of a combination of an upper core 6 and a lower core 7 with a high permeability characteristic and an annular exciting coil 8 arranged between both the cores 6 and 7. On the inner circumferential portion of the upper core 6, there are provided pole teeth 6a protruding downward in the form of a comb, and on the inner circumferential portion of the lower core 7, there are provided pole teeth (not shown) protruding upward in the form of a comb, these plural pole teeth being interleaved with each other and confronting the outer circumferential face (magnetized face) of the magnet 2. Similarly, the second stator 5 is formed of a combination of an upper core 9, with pole teeth (not shown) protruding downward in the form of a comb on its inner circumferential portion, and a lower core 10 with pole teeth 10a protruding upward in the form of a comb on its inner circumferential portion, and an annular exciting coil 11 arranged between both the cores 9 and 10. As described later, the pole teeth of the first stator 4 are offset in the circumferential direction from the pole teeth of the second stator 5, whereby there is usually provided a phase difference of 90 degrees in electrical angle between both the stators 4 and 5.

The stepping motor arranged as described above is adapted such that the rotor 1 is rotated by an angle corresponding to the number of steps when the exciting coils 8 and 11 are supplied with a pulse voltage and, thereby, the pole teeth of the cores 6, 7, 9, and 10 of the first and second stators 4 and 5 are excited.

FIG. 7 is a development of pole teeth of a conventional stepping motor of the described type, in which the pole teeth 6a and 7a of the upper and lower cores 6 and 7 of the first stator 4 are interleaved with a pitch α evenly dividing the total circumference. Also, the pole teeth 9a and 10a of the upper and lower cores 9 and 10 of the second stator 5 are interleaved with the pitch α, but the pole teeth of the first stator 4 (the phase thereof will be called phase A) and the pole teeth of the second stator 5 (the phase thereof will be called phase B) are arranged to be offset from each other by $\theta = \alpha/2$ in the circumferential direction. Here, since the angle α corresponds to an electrical angle of 180 degrees, the phase difference $\theta$ between the phase A and the phase B corresponds to 90 degrees in electrical angle.

The pattern of excitation of the above described two-phase stepping motor is as shown in FIG. 12. A vector diagram of the generated torques is shown in FIG. 8. The combined torques $A+B$ and $A-B$ respectively vary with the angle of rotation as shown in FIG. 9 and FIG. 10.

Accordingly, in the above described stepping motor, the combined torques $A+B$ and $A-B$ become the same in absolute value (refer to FIG. 9 and FIG. 10) and the torque generated at the time of stepping becomes as shown in FIG. 11.

In a two-phase-excited operation of such a stepping motor as described above, when the number of steps used for setting up each motion is an even number at all times, a higher starting speed can be obtained even with a large load, and following startup, a shorter step rate can be achieved by increasing the torque at the time of startup (odd-numbered step), and reduction of the overshoot and shortening of the settling time can be achieved by decreasing the torque at the time of settling (even-numbered step). However, the torques at the time of startup and settling in the above described conventional motor are of the same magnitude, i.e., the generated torque is not changed with the number of steps, and therefore, there has been such a difficulty that if it is attempted to increase the starting torque, the settling torque is also increased, and conversely, if it is attempted to decrease the latter, the former is also decreased. Further, high speed feeding has been unachievable by a carriage transport device employing such a stepping motor.

SUMMARY OF THE INVENTION

Accordingly, an object of the present invention is to provide a stepping motor capable of starting with a higher load and settling in a shorter time.

Another object of the present invention is to provide a carriage transport device capable of feeding at a higher speed.

To achieve the object mentioned first above, there is provided a stepping motor comprising a rotor having a cylindrical magnet magnetized such that multiple poles are arranged in its circumferential direction and supported for rotation, an annular first stator having the rotor inserted in the central cavity portion thereof with a gap therebetween, having numbers of juxtaposed pole teeth spaced at distances representing electrical degrees ($2\alpha$ shown in FIG. 1) in the form of combs whose teeth are interleaved with each other disposed at a position confronting the outer circumferential face of the magnet, and having an exciting coil disposed on the side of the outer circumference of the pole teeth, and an annular second stator having the rotor similarly inserted in the central cavity portion thereof with a gap therebetween, constructed similarly to the first stator, and having its top face fixedly attached to the bottom face of the first stator, the pole teeth of both of the stators, which are offset from each other in the circumferential direction so that a predetermined phase difference is provided therebetween, being exited to rotate the rotor, wherein the phase difference between the pole teeth of the first and second stators is set to 30-80 degrees or 100-150 degrees in electrical angle.

To achieve the object mentioned second above, there is provided a carriage transport mechanism employing the stepping motor as described above and adapted to drive its carriage by two-step feeding.

According to the above described first means, the magnitude of the combined torque of the generated torque by the pole teeth of the first stator and the generated torque by the pole teeth of the second stator becomes large when the step number is odd and becomes small when the step number is even. Accordingly, when the number of steps in one motion is an even number at all times, the starting torque can be increased and the settling torque can be decreased.

By increasing the starting torque as described above, the starting speed even with a large load can be made higher so as to follow a shorter step rate, and by decreasing the settling torque, overshoot can be reduced and settling time shortened.

According to the above described second means, high-speed feeding of the carriage can be attained by the use of the stepping motor of the first means.

BRIEF DESCRIPTION OF THE DRAWINGS

FIG. 12 is an explanatory diagram showing a pattern of excitation in the two-phase stepping motor of FIG. 7.

DESCRIPTION OF THE PREFERRED EMBODIMENT

An embodiment of the present invention will be described below with reference to FIG. 1 to FIG. 5.

Figure 1:
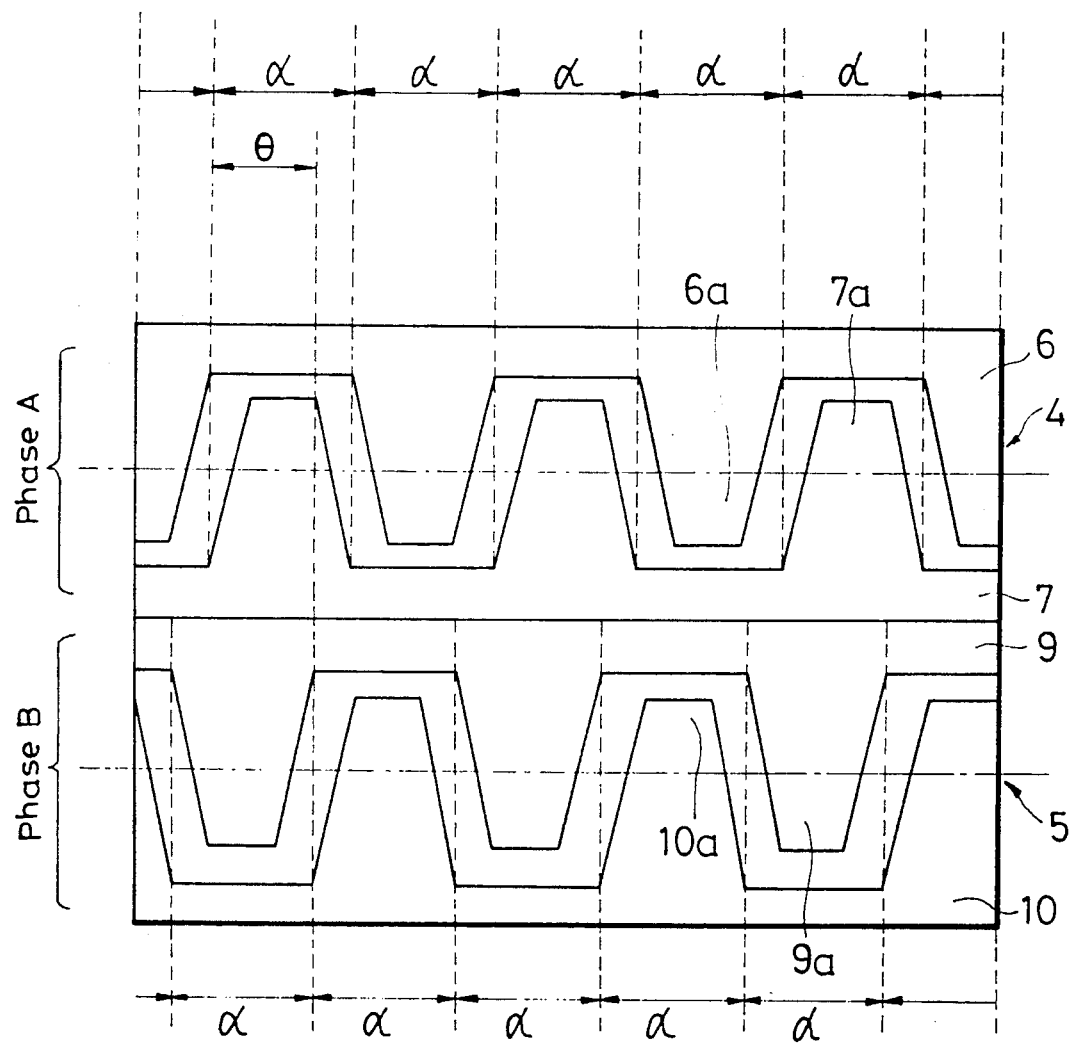
FIG. 1 is a development of pole teeth of a two-phase stepping motor according to an embodiment of the present invention.
Figure 6:
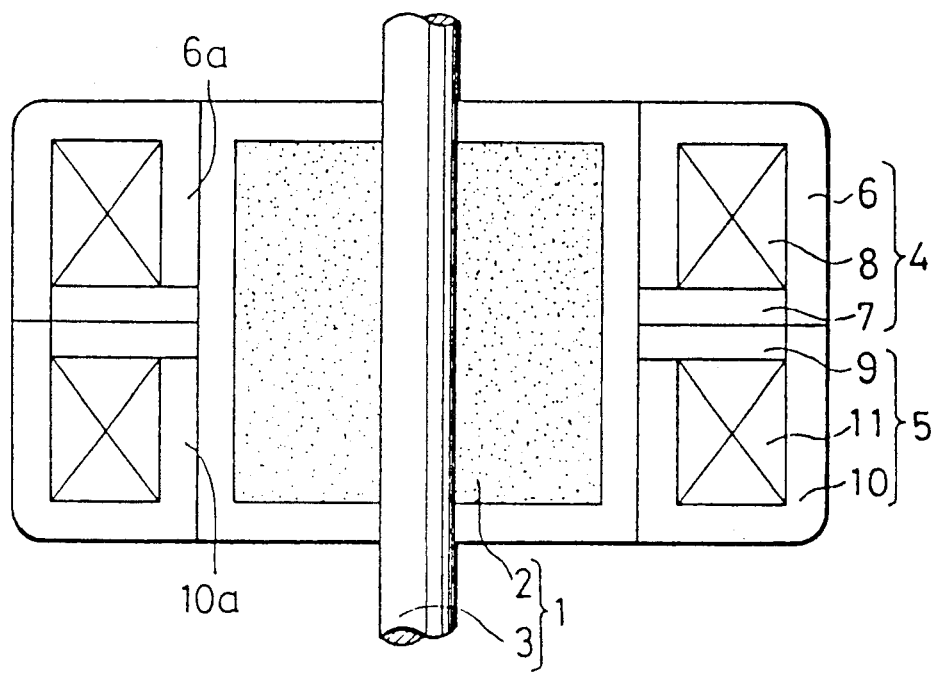
FIG. 6 is a sectional view showing a basic structure of a conventional two-phase stepping motor.
Figure 7:
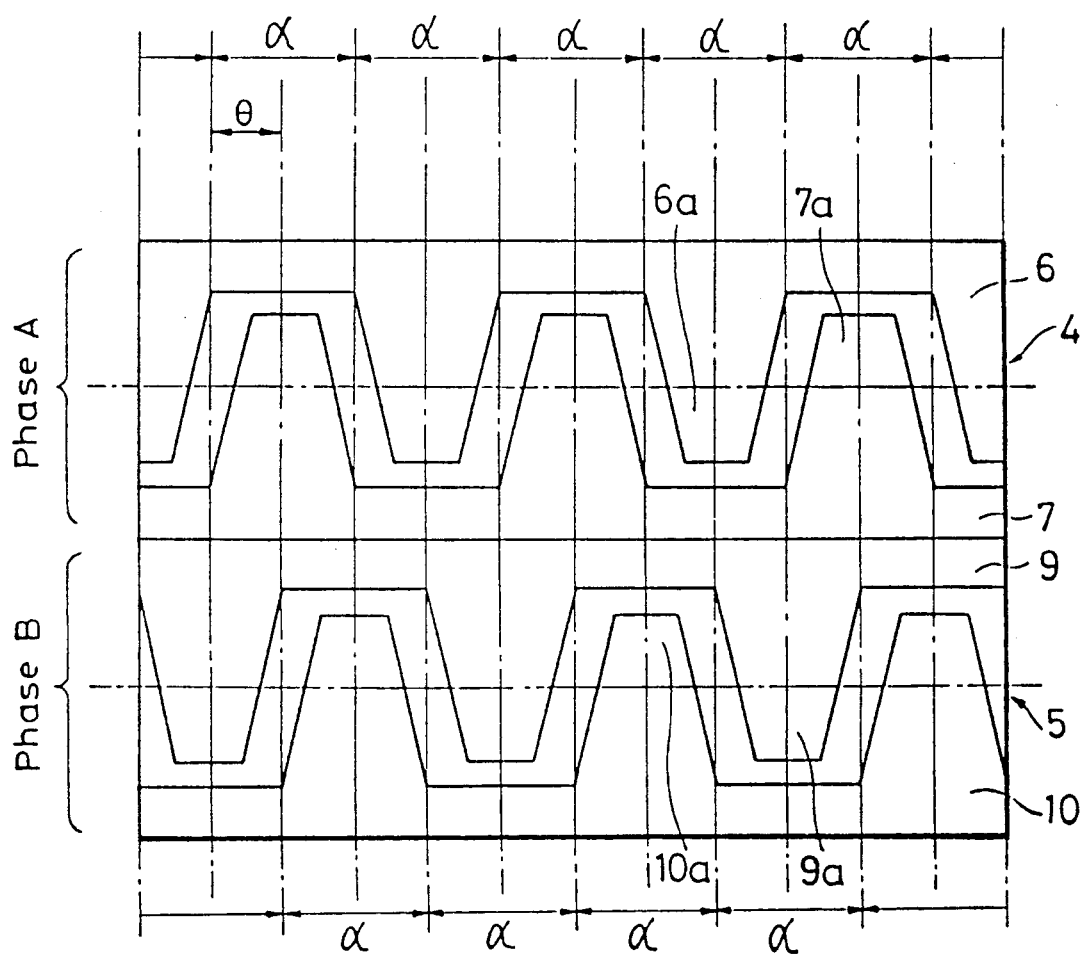
FIG. 7 is a development of pole teeth of the two-phase stepping motor of FIG. 6.
Figure 8:
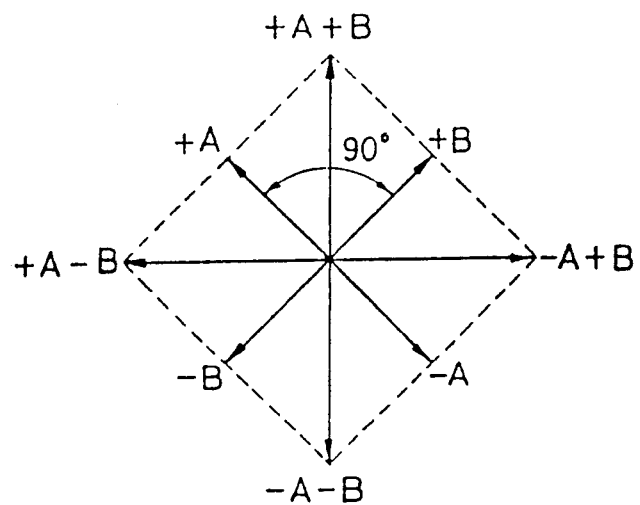
FIG. 8 is an explanatory diagram showing an excited state of a stepping motor at a phase difference of 90 degrees and vectors of generated torques by the stepping motor.
Figure 9:
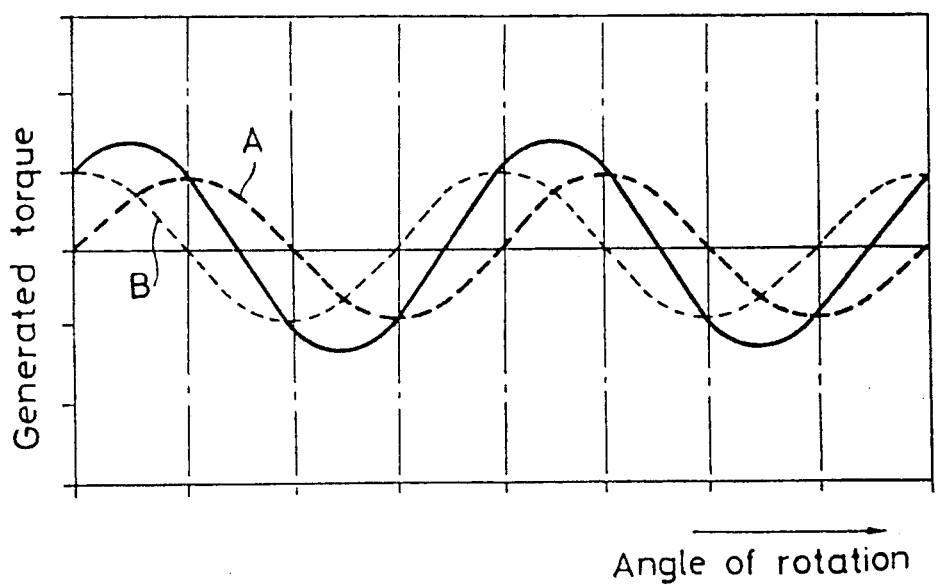
FIG. 9 is a characteristic curve showing a combined torque A+B of torques of the phase A and the phase B shown in FIG. 7.
Figure 10:
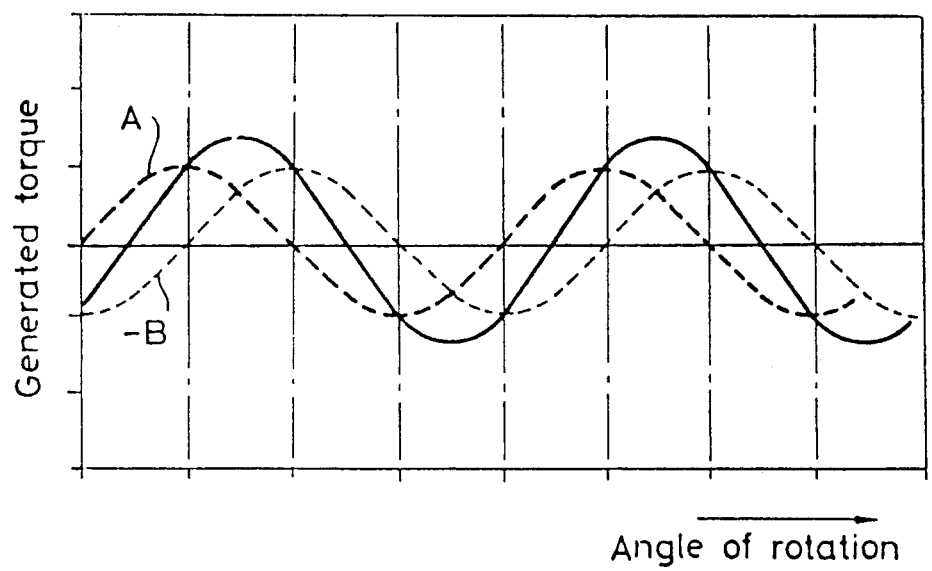
FIG. 10 is a characteristic curve showing a combined torque A-B of torques of the phase A and the phase B shown in FIG. 7.
Figure 11:
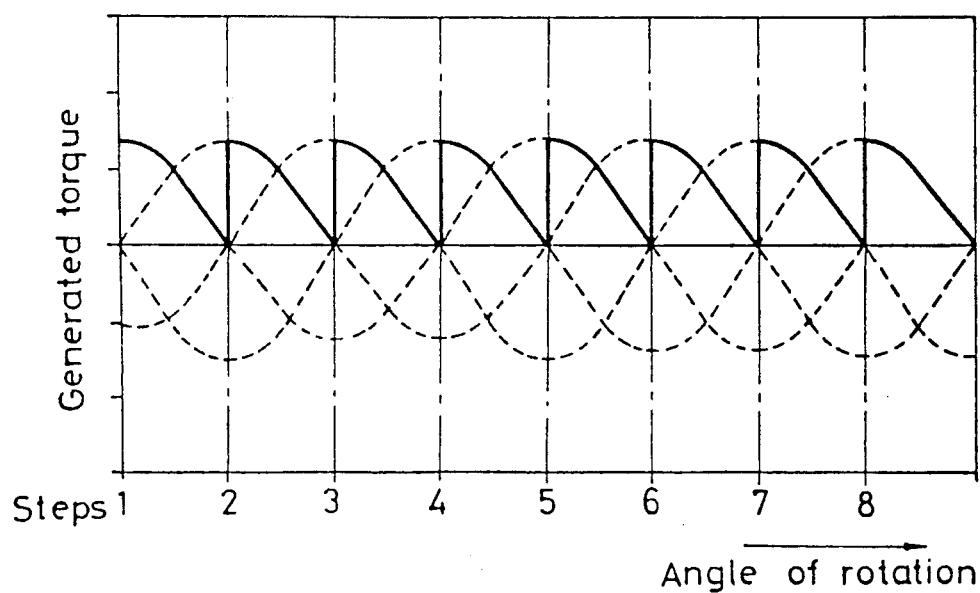
FIG. 11 is a characteristic curve showing a generated torque at the time of stepping as shown in FIG. 7.

FIG. 1 is a development of pole teeth of a two-phase stepping motor according to the present embodiment, in which parts corresponding to those in FIG. 6 and FIG 7 are denoted by like reference numerals.

As shown in FIG. 1, the pole teeth $6a$ of the upper core 6 and the pole teeth $7a$ of the lower core 7 of the first stator 4 are juxtaposed in the form of combs whose teeth are interleaved with each other with a pitch of $\alpha$, and similarly, the pole teeth $9a$ of the upper core 9 and the pole teeth $10a$ of the lower core 10 of the second stator 5 are juxtaposed in the form of combs whose teeth are interleaved with each other with a pitch of $\alpha$. Meanwhile, the pole teeth of the first stator 4 (whose phase will be called phase A) are offset from the pole teeth of the second stator 5 (whose phase will be called phase B) by an electrical angle of 135 degrees in the circumferential direction. More specifically, the phase difference $\theta$ between the phase A and the phase B is set to 135 degrees in conventional types.

Figure 2:
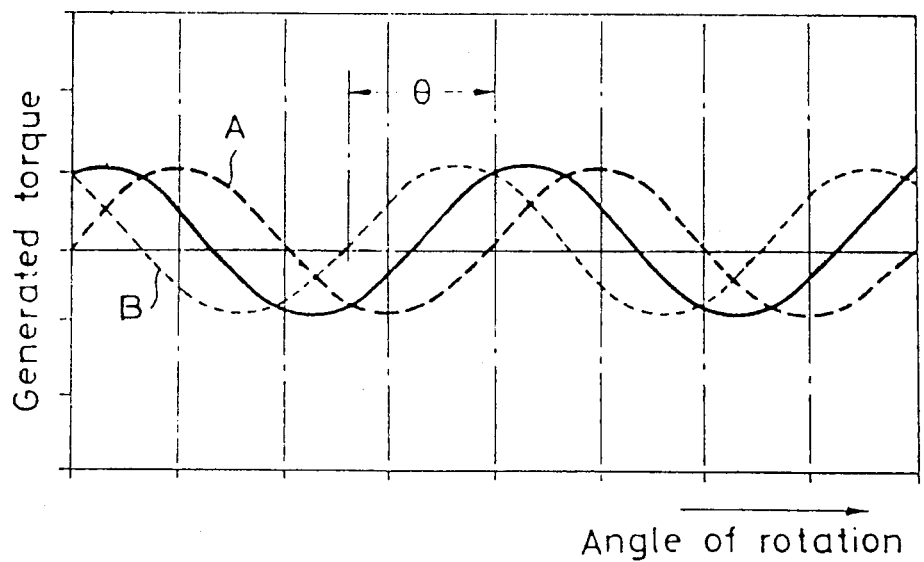
FIG. 2 is a characteristic curve showing a combined torque A+B of torques of the phase A and the phase B shown in FIG. 1.
Figure 3:
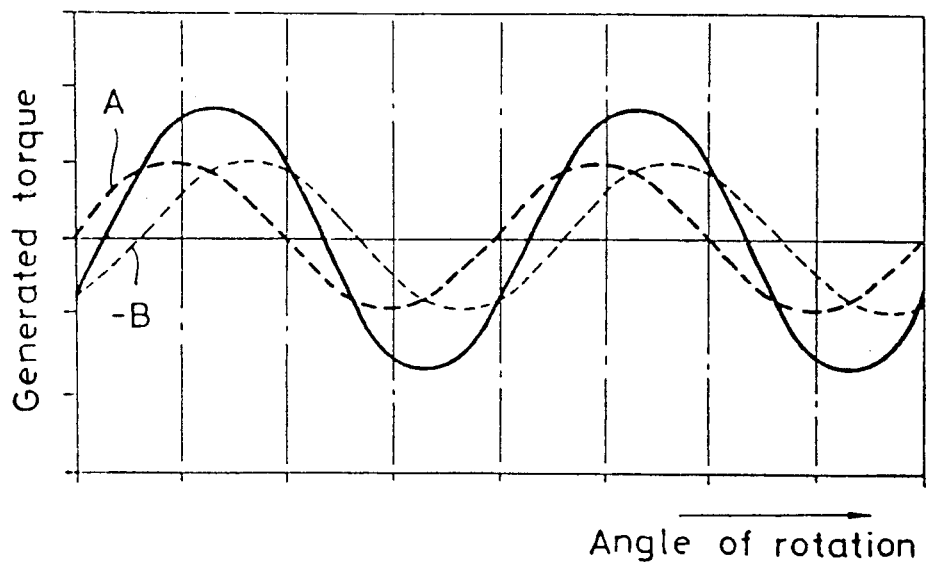
FIG. 3 is a characteristic curve showing a combined torque A-B of torques of the phase A and the phase B shown in FIG. 1.
Figure 4:
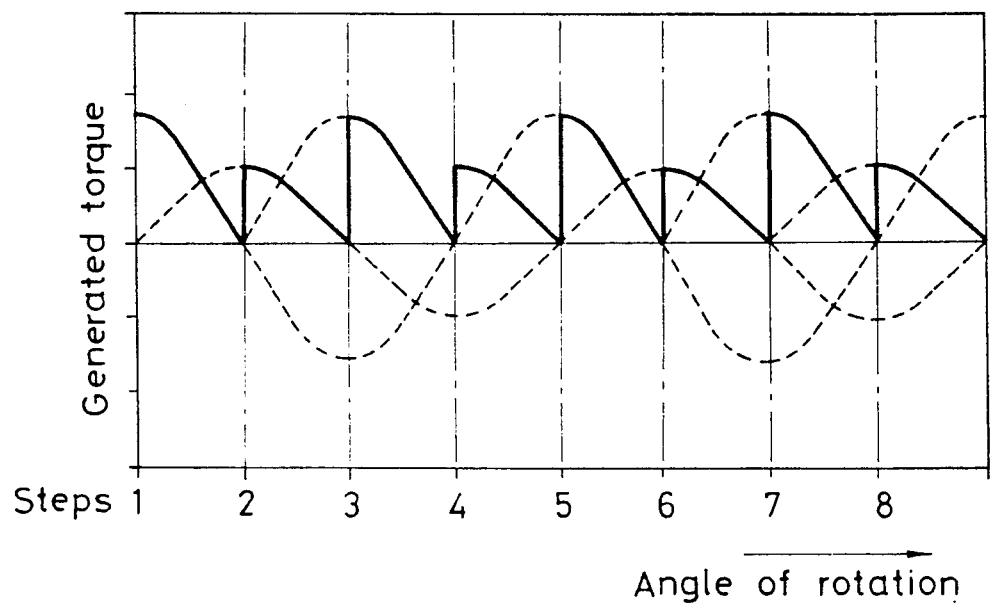
FIG. 4 is a characteristic curve showing a generated torque at the time of stepping as shown in FIG. 1.

The pattern of excitation in such two-phase stepping motor is as shown in FIG. 12 and the combined torques A+B and A−B vary with the angle of rotation as shown in FIG. 2 and FIG. 3. As shown in these figures, the combined torque A−B is larger than the combined torque A+B. Consequently, as shown in FIG. 4, the generated torque at the time of stepping becomes larger when the step number is odd and becomes smaller when it is even.

Therefore, when the number of steps used for setting up each motion is an even number at all times, the torque at the time of startup (at an odd-numbered step) becomes larger so that the starting speed even with a large load can be increased and a shorter step rate can be followed, and the torque at the time of settling (at an even-numbered step) becomes smaller so that overshoot can be reduced and settling time can be shortened.

Figure 5:
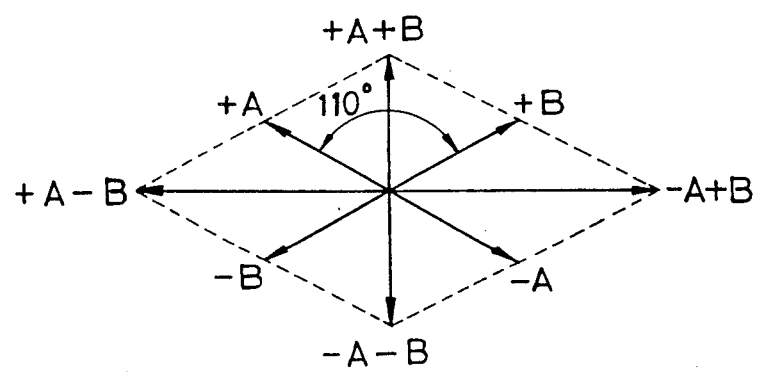
FIG. 5 is an explanatory diagram showing an excited state of a stepping motor at a phase difference of 110 degrees and vectors of generated torques by the stepping motor.

FIG. 5 is an explanatory diagram showing an excited state of a stepping motor and vectors of generated torques by the stepping motor. The diagram shows the case where the phase difference is set at 110 degrees, from which it is known that
$$|A+B|, |-A-B| < |A-B|, |-A+B|.$$

When the stepping motor is used, for example, for a carriage transport device of a disk drive apparatus, a satisfactory result can be obtained by having two-step driving performed for each track such that the excitation at the still point may become that providing the minimum torque $|A+B|, |-A-B|$.

By using such a stepping motor as described above as the drive source of a carriage transport device, high-speed feeding nof the carriage can be achieved.

In order to obtain accuracy in the angle of rotation, it has so far been required of the stepping motor to keep the phase difference at 90 degrees as accurately as possible. However, when the stepping motor is driven by two steps for each track as is usual with its application to a disk driving device, even if the phase difference is set to 110 degrees, the positional accuracy in the stepping is not adversely affected, by arranging that the required angular accuracy is obtained at intervals of two steps. According to results of experiments, the characteristics to follow shorter step rates and achieve fast settling are improved as the phase difference is increased. However, when the phase difference is increased beyond certain limits, step out of the stepping motor occurs depending on the conditions of load, voltage, step rate, etc., and the motor does not operate well when the phase difference reaches 150 degrees or so. The preferable phase difference is around 110 degrees.

Although the phase difference $\theta$ between the phase A and phase B was set to an electrical angle of 110 degrees or 135 degrees in the above described embodiment, any phase difference satisfying the relationship "combined torque at the time of settling < combined torque at the time of startup" may be set up. Virtually the same effects as described above can be obtained if, for example, the phase difference is set to 100-150 degrees of to 30-80 degrees in electrical angle.

According to the present invention as described in the foregoing, since the phase difference between the pole teeth of the first stator and the pole teeth of the second stator is set to 30-80 degrees of 100-150 degrees in electrical angle, the generated torque at the time of stepping is increased when the step number is even. Therefore, when the number of steps used for setting up each motion is an even number at all times, such good effects can be obtained in that the torque at the time of startup is increased and, hence, the motor starts up with a higher speed even with a large load and following, a shorter step rate can be achieved and the torque at the time of settling can be decreased and, hence, overshoot can be reduced and the settling time shortened.

Further, since the present invention makes it possible to follow a shorter step rate and to shorten the settling time, transport of a carriage at a higher speed can be attained.

What is claimed is:

1. A stepping motor comprising:
   a rotor disposed to rotate about an axis;
   a first cylindrical stator disposed around said rotor comprising:
      a first core (6) having a first plurality of evenly spaced-apart teeth, each of said first plurality of evenly spaced-apart teeth extending in a first direction parallel to said axis, and
      a second core (7) having a second plurality of evenly space-apart teeth, each of said second plurality even spaced-apart teeth extending in a second direction parallel to said axis and being interleaved with said first plurality of evenly spaced-apart teeth; and
   a second stator (5) disposed around said rotor and fixedly connected to said first stator comprising:
      a third cord (9) having a third plurality of evenly space-apart teeth extending in said first direction parallel to said axis, and
      a fourth core (10) having a fourth plurality of evenly space-apart teeth, each of said fourth plurality of evenly space-apart teeth extending in said second direction parallel to said axis and being interleaved with said third plurality of evenly space-apart teeth;
   wherein said first, second, third and fourth pluralities of evenly space-apart teeth are commonly spaced at distances representing 360 electrical degrees, and said first plurality of evenly spaced-apart teeth is offset from said third plurality of evenly space-apart teeth by a distance representing 30 to 80 electrical degrees.

2. A stepping motor comprising:
   a rotor disposed to rotate about an axis;
   a first cylindrical stator disposed around said rotor comprising:
      a first core (6) having a first plurality of evenly spaced-apart teeth, each of said first plurality of evenly spaced-apart teeth extending in a first direction parallel to said axis, and
      a second core (7) having a second plurality of evenly space-apart teeth, each of said second plurality of evenly space-apart teeth extending in a second direction parallel to said axis and being interleaved with said first plurality of evenly spaced-apart teeth; and
   a second stator (5) disposed around said rotor and fixedly connected to said first stator comprising:
      a third core (9) having a third plurality of evenly space-apart teeth, each of said third plurality of evenly space-apart teeth extending in said first direction parallel to said axis, and
      a fourth core (10) having a fourth plurality of evenly spaced-apart teeth, each of said fourth plurality of evenly spaced-apart teeth extending in said second direction parallel to said axis and being interleaved with said third plurality of evenly space-apart teeth;
   wherein said first, second, third and fourth pluralities of evenly spaced-apart teeth are commonly spaced at distances representing 360 electrical degrees, and said first plurality of evenly spaced-apart teeth is offset from said third plurality of evenly spaced-apart teeth by a distance representing 100 to 150 electrical degrees.

* * * * *